(12) United States Patent
Drakes

(10) Patent No.: US 8,091,290 B1
(45) Date of Patent: Jan. 10, 2012

(54) GEODESIC ENTERTAINMENT SPHERE

(76) Inventor: William Drakes, Tampa, FL (US)

( * ) Notice: Subject to any disclaimer, the term of this patent is extended or adjusted under 35 U.S.C. 154(b) by 783 days.

(21) Appl. No.: 12/228,340

(22) Filed: Aug. 12, 2008

(51) Int. Cl.
*E04B 7/08* (2006.01)

(52) U.S. Cl. ............... 52/81.1; 52/6; 472/136; 348/383; 345/1.3

(58) Field of Classification Search ............... 52/6, 81.1; 472/59, 60, 61, 130, 136; 348/36, 37, 38, 348/39, 383, 739; 345/1.3
See application file for complete search history.

(56) References Cited

U.S. PATENT DOCUMENTS

| | | | | |
|---|---|---|---|---|
| 4,160,345 A | * | 7/1979 | Nalick | 52/81.4 |
| 4,631,867 A | * | 12/1986 | Reed | 451/361 |
| 4,642,945 A | * | 2/1987 | Browning et al. | 52/10 |
| 4,750,807 A | * | 6/1988 | Chamayou dit Felix | 359/451 |
| 4,848,047 A | * | 7/1989 | Sneyd | 52/81.2 |
| 5,097,640 A | * | 3/1992 | Skolnick et al. | 52/81.3 |
| 5,315,801 A | * | 5/1994 | Anderson et al. | 52/63 |
| 5,377,460 A | * | 1/1995 | Hicks | 52/81.1 |
| 5,926,153 A | * | 7/1999 | Ohishi et al. | 345/1.1 |
| 6,067,502 A | | 5/2000 | Hayashida et al. | |
| 6,134,849 A | * | 10/2000 | Holler | 52/80.1 |
| 6,141,034 A | | 10/2000 | McCutchen | |
| 6,292,134 B1 | * | 9/2001 | Bondyopadhyay | 342/374 |
| 6,377,306 B1 | | 4/2002 | Johnson et al. | |
| 6,456,335 B1 | | 9/2002 | Miura et al. | |
| 6,658,800 B2 | * | 12/2003 | Monson et al. | 52/81.1 |
| 6,755,536 B2 | | 6/2004 | Tegreene et al. | |
| 6,831,678 B1 | | 12/2004 | Travis | |
| 6,880,298 B2 | * | 4/2005 | Davies | 52/81.1 |
| 6,956,477 B2 | | 10/2005 | Chun | |
| 6,989,800 B2 | * | 1/2006 | McLaughlin | 345/1.3 |
| 7,205,962 B2 | | 4/2007 | Cooke | |
| 7,509,922 B2 | * | 3/2009 | Page | 119/223 |
| 7,719,480 B2 | * | 5/2010 | Devos et al. | 345/1.3 |
| 7,774,992 B2 | * | 8/2010 | Garofalo et al. | 52/81.3 |
| 2001/0028369 A1 | * | 10/2001 | Gallo et al. | 345/848 |
| 2003/0133037 A1 | * | 7/2003 | Lee | 348/383 |
| 2003/0167702 A1 | * | 9/2003 | Davies | 52/81.1 |
| 2007/0273757 A1 | * | 11/2007 | Mader et al. | 348/36 |
| 2008/0066393 A1 | * | 3/2008 | Sorensen | 52/81.1 |
| 2008/0209821 A1 | * | 9/2008 | Nefzi | 52/81.4 |

OTHER PUBLICATIONS

IBM Technical Disclosure Bulletin, US NN9009436, Publication-Date: Sep. 1, 1990.*

* cited by examiner

*Primary Examiner* — Robert Canfield
*Assistant Examiner* — Matthew Gitlin
(74) *Attorney, Agent, or Firm* — Edward P. Dutkiewicz

(57) ABSTRACT

A device comprising a generally rounded configuration having an inner surface and interior, and an outer surface. There is a wall thickness between the inner surface and outer surface. The entertainment device has a base having a generally tubular configuration with walls and a floor. The base couples to the entertainment Sphere, and forms the base thereof. The device has a plurality of screen subassemblies coupled to the wall thickness of the entertainment device sphere.

14 Claims, 5 Drawing Sheets

GEODESIC ENTERTAINMENT SPHERE

NEW RULE 1.78 (F)(1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to a Geodesic Entertainment Sphere and more particularly pertains to a construct to display a performance or information on the surface of a Sphere.

2. Description of the Prior Art

The use of public display devices is known in the prior art. More specifically, public display devices previously devised and utilized for the purpose of displaying or providing information are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art does not describe a geodesic entertainment Sphere that allows a construct to display a performance or information on the surface of a Sphere.

In this respect, the geodesic entertainment sphere, according to the present invention, substantially departs from the conventional concepts and designs of the prior art, and in doing so provides an apparatus primarily developed for the purpose of a construct to display a performance or information on the surface of a Sphere.

Therefore, it can be appreciated that there exists a continuing need for a new and improved Geodesic Entertainment Sphere which can be used for a construct to display a performance or information on the surface of a Sphere. In this regard, the present invention substantially fulfills this need.

SUMMARY OF THE INVENTION

In view of the foregoing disadvantages inherent in the known types of public display devices now present in the prior art, the present invention provides an improved geodesic entertainment Sphere. As such, the general purpose of the present invention, which will be described subsequently in greater detail, is to provide a new and improved Geodesic Entertainment Sphere and method of using the construct, which has all the advantages of the prior art and none of the disadvantages.

To attain this, the present invention essentially comprises a geodesic sphere-shaped entertainment device having a generally rounded configuration. The entertainment device with an inner surface, an outer surface and a wall thickness there between. The wall thickness generally being framing, with the framing having a plurality of openings there through. The framing configuration of the wall forming a generally regularly shaped lattice configuration. The inner surface of the wall forming the extent of an interior space. The interior space is located within the geodesic Sphere shaped entertainment device.

Next provided is an entertainment device base. The base has a generally hollow tubular configuration with walls having a generally concave outer surface and a generally planar inner surface. The base couples with the entertainment Sphere, and forms a base thereof. The base has an interior space located within the inner surface, with an opening there into. The base has a floor. The floor has a top surface and a bottom surface, with a thickness there between. The base has a plurality of passageways there through, with the passageways running from the floor top surface to the floor bottom surface. The passageways of the floor each contain a conduit, with one conduit being configured to carry a water line, a second conduit being configured to carry an electric line, and a third conduit being configured to carry a coaxial line.

Next provided is a plurality of screen subassemblies. The screen subassemblies are each coupled to the lattice configured wall thickness of the entertainment device Sphere. Each screen subassembly has an inner extent and an outer extent. Each of the screen subassemblies has several components, in combination.

The first component of each of the screen subassemblies is an associated screen frame. Each of the screen frames has a generally trapezoidal shaped configuration, having a narrow end and a wide end. The wide end and narrow end each has a length. The wide end length is longer than the narrow end length.

The frame has a generally C-shaped configuration with an outer side wall having a free edge, an inner side wall having a free edge, and a base wall coupling the inner side wall and the outer side wall in a generally parallel orientation. The frame has an aperture there through. The inner side wall has a length that is greater than the length of the outer side wall. The base wall is oriented perpendicular to the side walls. The base wall and side walls form an inset of each screen frame. The inset is oriented toward the inner extent.

The second component of each of the screen subassemblies is a pair of associated attachment bars. The attachment bars each have a frame attachment end and a entertainment device attachment end. The entertainment device attachment end of the bar has a coupling means coupled there to. The screen frame attachment end of the attachment bar having a coupling means coupled there to.

The third component of the each of the subassemblies is an associated internal gasket. The internal gasket is located on the edge of the outer side wall. The subassembly has an associated flat plate display panel coupled to the outer surface of the base of the frame. The flat panel display has an electrical coupling cable and a power cable. The coupling cable and power cable pass through the frame aperture into the interior of the Sphere.

The fourth component of each of the subassemblies is a flat plate tempered glass pane protective sheet. The protective glass pane is located at the outermost extent of the subassembly. The tempered glass pane has a generally trapezoidal shaped configuration. The pane has a narrow end and a wide end. The wide end and narrow end are parallel with each other. Both the narrow end and the wide end each have a length. The wide end length is longer than the narrow end length. The tempered glass pane has an upper end and a lower end connecting the wide end and the narrow end.

The fifth component of each of the subassemblies is an associated external gasket. The external gasket is located between the flat plate tempered glass and the flat panel display.

The internal gasket is located between the screen frame and the lattice wall of the entertainment device. The screen frame attachment end clamp is configured to clamp the flat plate glass and the flat panel display to the frame.

The geodesic sphere-shaped entertainment device further comprises the interior space having a control panel. The control panel comprises electrical controls, water controls, and communications controls. The communications controls comprise a computer having a program with a memory, with the program being configured to control the input and output to and from the computer. The computer is coupled to the flat panel display by a signal coupling means.

Lastly, the interior space of the generally sphere-shaped entertainment device has a maintenance lift located therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. Any relation to "sphere" is not in the mathematical sense, being surface that is equidistant from a point, rather, because of the flattened areas and surfaces, a "true" sphere is not possible. By use of the word "sphere" it is meant a very generally rounded structure, which includes flattened areas. From a distance the device may appear "like a sphere", but it is not perfectly round.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved geodesic entertainment sphere which has all of the advantages of the prior art public display devices and none of the disadvantages.

It is another object of the present invention to provide a new and improved geodesic entertainment sphere which may be easily and efficiently manufactured and marketed.

It is further object of the present invention to provide a new and improved geodesic entertainment sphere which is of durable and reliable construction.

An even further object of the present invention is to provide a new and improved geodesic entertainment Sphere which is susceptible of a low cost of manufacture with regard to both materials and labor, and which accordingly is then susceptible of low prices of sale to the consuming public, thereby making such geodesic entertainment sphere economically available to the buying public.

Even still another object of the present invention is to provide a geodesic entertainment Sphere for a construct to display a performance or information on the surface of a sphere.

Lastly, it is an object of the present invention to provide a new and improved geodesic sphere-shaped entertainment device comprising a generally rounded configuration having an inner surface and interior, and an outer surface. There is a wall thickness between the inner surface and outer surface. The entertainment device has a base having a generally tubular configuration with walls and a floor. The base couples to the entertainment sphere, and forms the base thereof. The device has a plurality of screen subassemblies coupled to the wall thickness of the entertainment device Sphere.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
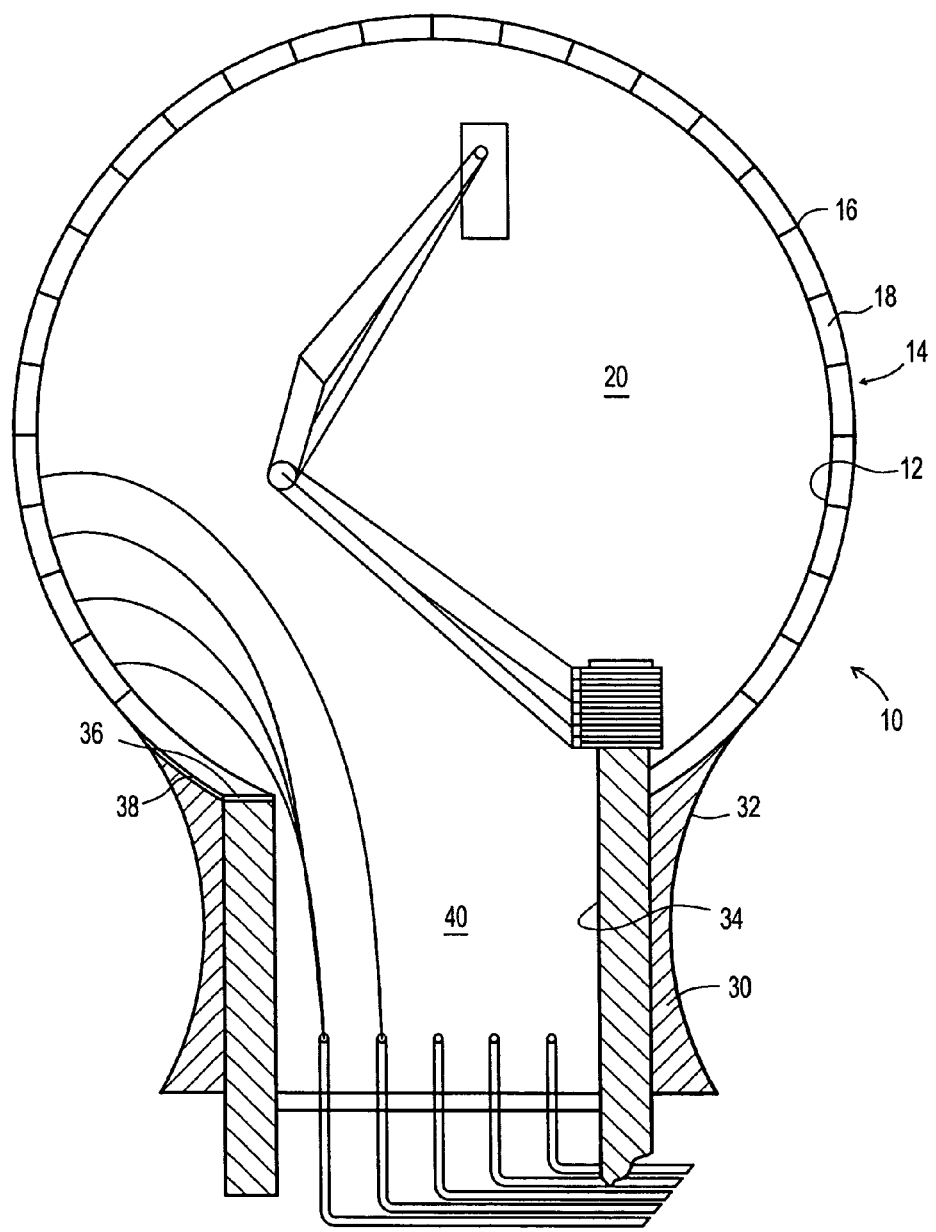
FIG. 1 is a cross sectional side elevational view of the geodesic entertainment system.
Figure 2:
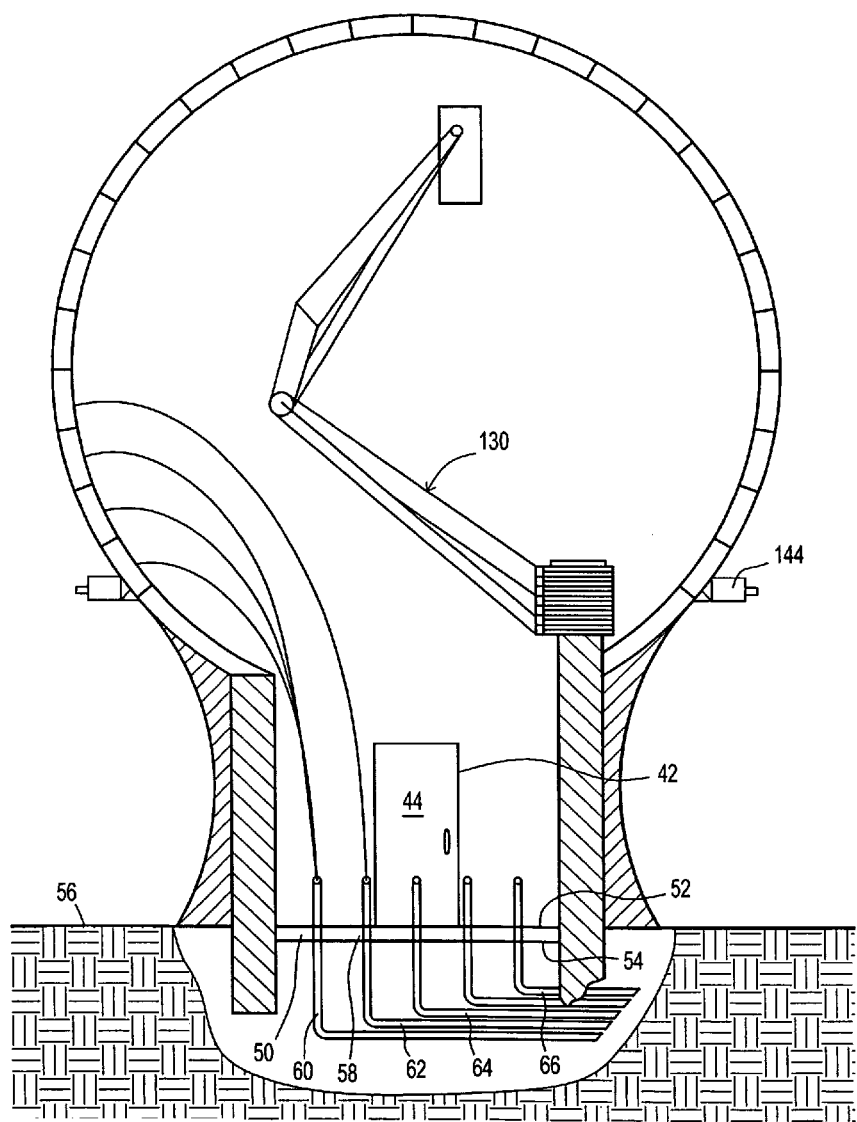
FIG. 2 is a cross sectional side elevational view of the geodesic entertainment system with exterior cameras included in the system, as well as demonstrating the location of an access doorway.
Figure 3:
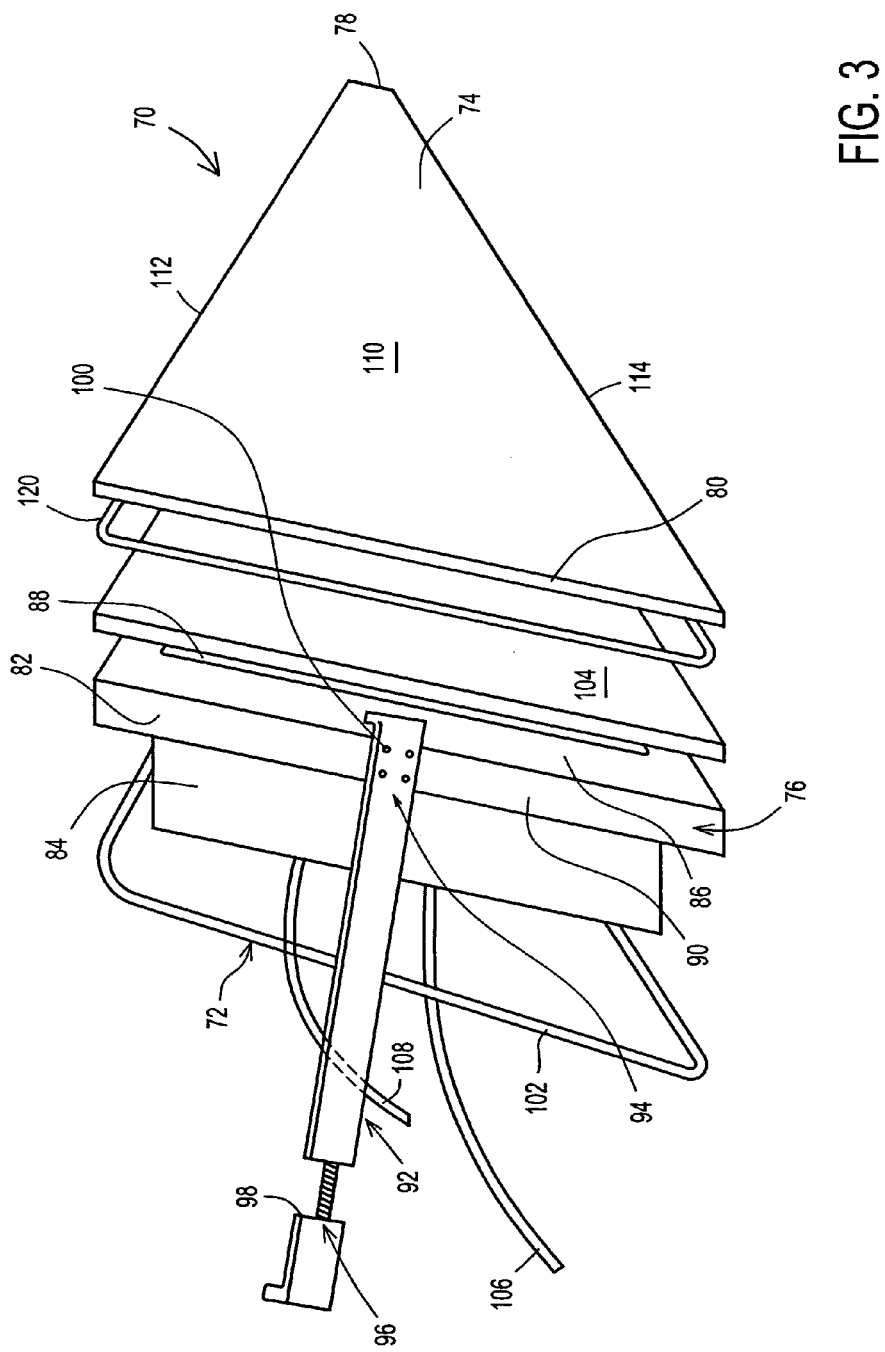
FIG. 3 is an exploded view of the subassembly showing the trapezoidal shaped subassembly, with the components in close proximity.
Figure 4:
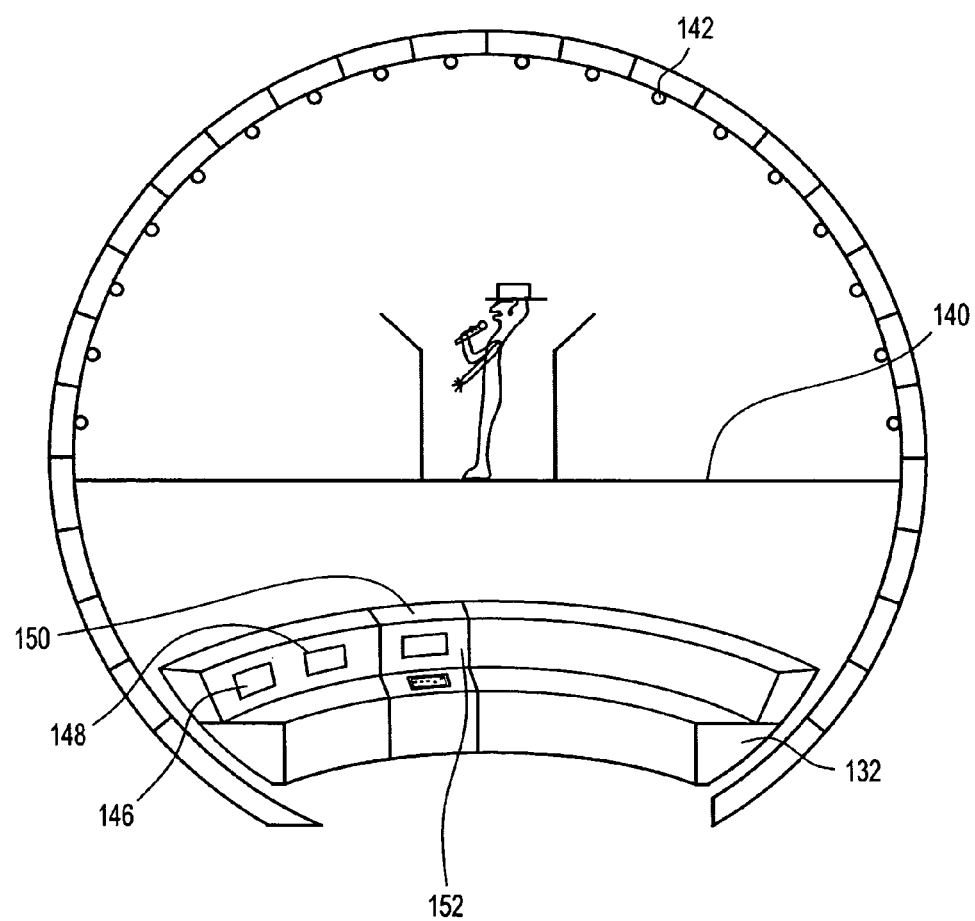
FIG. 4 is a cross sectional side elevational view of the geodesic entertainment system with the system comprising an interior performance stage. In this configuration the system may function as a performing studio.
Figure 5:
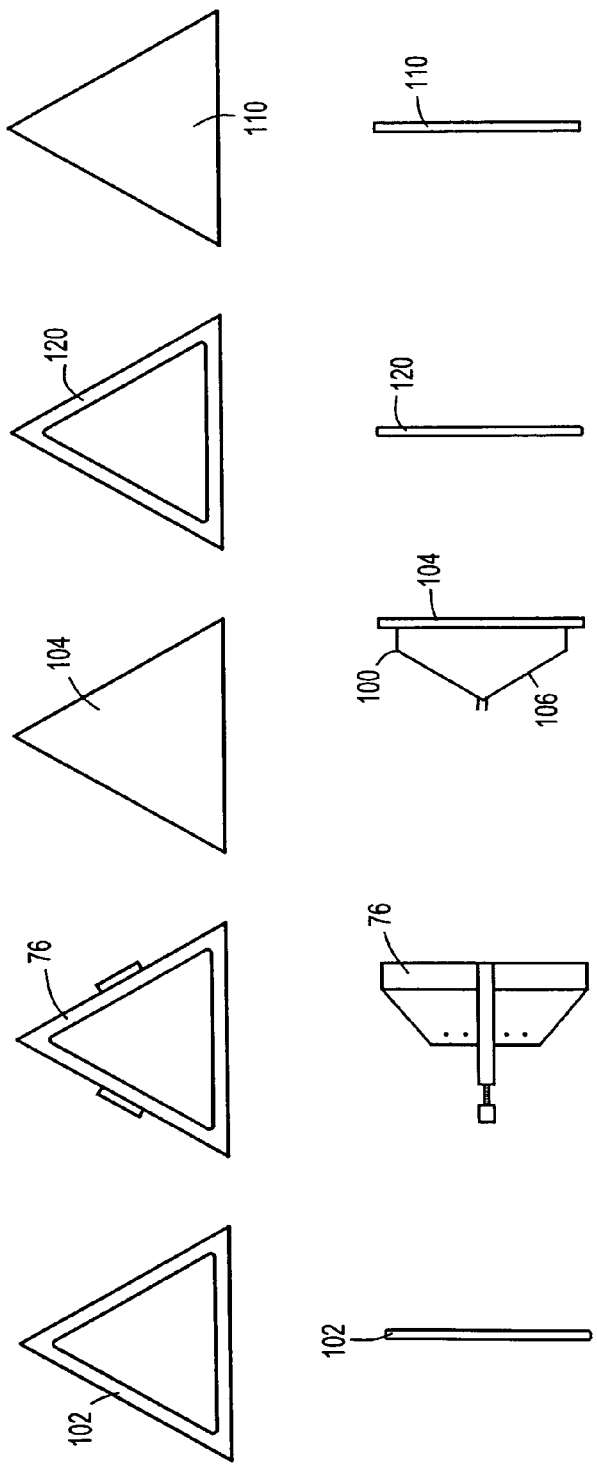
FIG. 5 is a compilation of front and side exploded views of the subassembly of the system, with the subassembly having a triangular configuration.

With reference now to the drawings, and in particular to FIG. 1 thereof, the preferred embodiment of the new and improved geodesic entertainment Sphere embodying the principles and concepts of the present invention and generally designated by the reference numeral 10 will be described.

The present invention, the geodesic entertainment sphere 10 is comprised of a plurality of components. Such components in their broadest context include a sphere, a base, a control system and an electrical system, including a power source. Such components are individually configured and correlated with respect to each other so as to attain the desired objective.

A geodesic sphere-shaped entertainment device having a generally rounded configuration. The entertainment device with an inner surface 12, an outer surface 14 and a wall thickness there between. The wall thickness generally being framing 16, with the framing having a plurality of openings 18 there through. The framing configuration of the wall forms a generally regularly shaped lattice configuration. The inner surface of the wall forms the extent of an interior space 20. The interior space is located within the geodesic sphere shaped entertainment device. The interior space may serve various functions, and will be discussed below. The framing is made of a generally corrosion resistant material, such as stainless steel, though other materials, such as composites, may be used.

Next provided is an entertainment device base 30. The base has a generally hollow tubular configuration with walls having a generally concave outer surface 32 and a generally planar inner surface 34. The base couples with the entertainment sphere, and forms a base thereof. The coupling between the base and the sphere 36 may be accomplished by the use of standard joining technology, such as by bolts, weldments, continuous, poured concrete and clamps. As part of the coupling, a gasket 38 may be used to effectuate a weather seal. The base has an interior space 40 located within the inner surface, with an opening 42 there into. In the preferred embodiment, the opening is a door 44. There may also be windows and other types of openings, being pass-throughs, in the base wall. The base tubular configuration may be angled, or rounded, depending on effect desired. In some applications it may be Golf Tee shaped.

The base has a floor 50. The floor has a top surface 52 and a bottom surface 54, with a thickness there between. The floor serves as a point of attachment to a recipient surface, such as the ground 56. The base has a plurality of passageways 58 there through, with the passageways running from the floor top surface to the floor bottom surface. In other embodiments, the passageways in the base may be through the base wall.

The passageways of the floor each contain a conduit 60, with one conduit being configured to carry a water line 62, a second conduit being configured to carry an electric line 64, and a third conduit being configured to carry a coaxial line 66.

Next provided is a plurality of screen subassemblies 70. The screen subassemblies are each coupled to the lattice configured wall thickness of the entertainment device sphere. In general, the subassemblies are quite similar to each other. Each screen subassembly has an inner extent 72 and an outer extent 74. Each of the screen subassemblies has several components, in combination.

The first component of each of the screen subassemblies is an associated screen frame 76. The frame is made of a generally corrosion resistant material, such as stainless steel, though other materials, such as composites, may be used. Each of the screen frames has a generally trapezoidal shaped configuration, having a narrow end 78 and a wide end 80. It is intended that the phrase "trapezoidal shaped" includes "triangular shaped" in that one end is wider than the other end. The wide end and narrow end each has a length. The wide end length is longer than the narrow end length.

In other embodiments, the subassemblies may have any geometric shape, such as triangles, rectangles, or circles. The flat planar surfaces of the subassemblies are included within the framework of the entertainment sphere, and while not forming a true round structure, the presence and locations of the subassemblies, at various orientations, intimates a sphere, or a generally rounded structure.

The frame has a generally C-shaped configuration with an outer side wall 82 having a free edge, an inner side wall 84 having a free edge, and a base wall 86 coupling the inner side wall and the outer side wall in a generally parallel orientation. The frame has an aperture 88 there through. The inner side wall has a length that is greater than the length of the outer side wall. The base wall is oriented perpendicular to the side walls. The base wall and side walls form an inset 90 of each screen frame. The inset is oriented toward the inner extent. The frame is anchored, as described below, to the wall of the geodesic sphere. In the preferred embodiment, the frame is generally trapezoidal in shape. In other embodiments, the frame may have any geometric shape.

The second component of each of the screen subassemblies is a pair of associated attachment bars 92. The attachment bars each have a frame attachment end 94 and a entertainment device attachment end 96. The entertainment device attachment end of the bar has a coupling means 98 coupled there to. The coupling means for the attachment bars may be clamps, clips, bolts, screws, adhesives, wires, ties, weldments, and snaps, either alone or in combination. By this is meant that one end of the attachment bar may be fastened with screws, and the other end may have a clamp to carry out the coupling and attachment. Any combination of attachment means is anticipated. In the preferred embodiment the entertainment device attachment end has an associated clamp, and the frame attachment end has a plurality of screws 100. The screen frame attachment end of the attachment bar having a coupling means coupled there to. The coupling means for the screen frame attachment end are the same as for the entertainment end of the attachment bar.

The third component of the each of the subassemblies is an associated internal gasket 102. The gasket is made of standard gasket material, and may be a material such as neoprene, rubber, and cork, as well as other commonly used gasket materials. The internal gasket is located on the edge of the outer side wall.

The subassembly has an associated flat plate display panel 104 coupled to the outer surface of the base of the frame. The flat panel display has an electrical coupling cable 106 and a power cable 108. The coupling cable and power cable pass through the frame aperture into the interior of the Sphere.

The fourth component of each of the subassemblies is a flat plate tempered glass pane protective sheet 110. The protective glass pane is located at the outermost extent of the subassembly. In the preferred embodiment the tempered glass pane has a generally trapezoidal shaped configuration, though in other embodiments, the pane may be any geometric shape which is consistent with the subassembly frame. The pane has a narrow end and a wide end. The wide end and narrow end are parallel with each other. Both the narrow end and the wide end each have a length. The wide end length is longer than the narrow end length. The tempered glass pane has an upper end 112 and a lower end 114 connecting the wide end and the narrow end.

The fifth component of each of the subassemblies is an associated external gasket. The external gasket is located between the flat plate tempered glass and the flat panel display.

The internal gasket 120 is located between the screen frame and the lattice wall of the entertainment device. The screen frame attachment end clamp is configured to clamp the flat plate glass and the flat panel display to the frame.

The components of the subassembly have a like configuration. If the frame is trapezoidal, all components have a like trapezoidal configuration. So, too, in the case where the subassembly frame is round, triangular, or some other geometric configuration. In those instances all components of the subassembly are configured in a like fashion.

It should be noted that some geometric configurations may give more support and strength to the overall structure. This is true with the use of a triangular shaped subassembly.

In practice, the display is held within the frame, with the gaskets forming an interior and exterior seal. The protective glass pane serves to protect the display from weather, flying debris, and, more importantly, vandalism. The protective glass pane is impact and shatter resistant. In another embodiment, the pane may be a ultraviolet stabilized polycarbonate, or other such clear, impact resistant material, such as an acrylic 130. The protective pane may have a wire mesh contained therein, to prevent shattering of the protective pane.

The display coaxial cables carry a signal, audio and visual, to the display from the control panel, as described below. The frame provides a rigid housing for the mounting of the display and the protective pane. The gaskets make the subassembly weatherproof.

The geodesic sphere-shaped entertainment device control panel comprises electrical controls, water controls, and communications controls. The communications controls comprise a computer having a program with a memory, with the program being configured to control the input and output to and from the computer. The computer is coupled to the flat panel display by a signal coupling means.

Lastly, the interior space of the sphere-shaped entertainment device has a maintenance lift 130 located therein.

In another embodiment, the panel display and glass pane are curved to more closely represent the surface of a rounded object, so as to make the entertainment sphere appear more generally rounded.

The functionality of the entertainment sphere is that of providing a generally spherically shaped viewing surface. One application would be the display of a world weather map, showing cloud formations, weather fronts, and other weather indicators. The viewing would be in a three dimensional format, and would relate the shape of the multiply assembled viewing screen with the reality of the weather picture across the earth. The interior space can house computers and electrical connections to activate, control, and display the desired material on the plurality of screens that make up the sphere shaped construct of the Sphere. Of course, the shape is not perfectly spherical, as there are multiple "flat" surfaces, formed by the display screens. The shape implies a sphere.

In operation, a technician at the main control console 132 has the ability to control every pixel on the surface of the sphere. In one mode of operation the output, or the image that appears on the sphere surface, is controlled by a data set, which is a library of programs. In this mode, the data sets are inputted into the control computer in a "closed circuit" fashion. The data sets may be provided by external link-up or from a data stream directly from the computer.

The interior can also be a performing stage 140, with multiple cameras, giving a three dimensional view of the performer on each of the screens. The multiple screens may also form a platform for the display of corporate trademarks, and logos. The display may be a circular ticker tape, visible from all directions around the device.

The interior may have maintenance lifts, or camera dollies, as in the case of an interior performing stage. The system may have a plurality of interior stage cameras 142 to give a view from multiple angles. Exterior cameras 144 may be used to display, on a display screen of the control panel 146, a picture of what is happening outside of the sphere, so as to allow those persons inside the sphere to be able to see the surrounding area, without the use of windows. In this application, the interior would have a viewing screen 148, an exterior view control panel 150, and a program within a computer 152 to control the input from the cameras, as well as to control the direction of viewing of the cameras.

In another embodiment the pressure within the sphere is kept elevated at two pounds per square inch above the ambient pressure on the outside of the sphere. The pressurization is accomplished by an air conditioning system that filters and dries the air inside the entertainment sphere. This pressurization of the interior of the sphere pushes impinging contaminants outward, and out of the sphere's interior, keeping the amount of fouling and corrosion to a minimum.

The structure dimensions are that the diameter across the Sphere, through the center of the sphere is about 30 feet. The base is about 8 feet tall and about 15 feet across, giving an overall height of about 38 feet. The outside surface is divided into six "leaves" per half of sphere. There are 81 display panels per leaf. The upper half has 486 display panels. There are 56 display panels for the four rows of display panels located beneath the central horizontal axis, or equator, of the Sphere. Overall there are 542 display panels which make up the entertainment sphere.

Using a sphere structure, as herein described, allows a live performance from the stage within, irrespective of the weather and atmospheric conditions outside. Also, with the outside mounted cameras, the controller, working from the control panel, may monitor the crowd around the Sphere. The controller may in turn signal the performer, either by a light, or hand signal, or some other acceptable signal, to turn toward the direction of the crowd where a response is sought. In the alternative, the stage may be rotated, with the performer remaining fixed, providing a performance "in the round". The manipulation of images is well known in the art, and one skilled in the art would realize and understand the application of such image manipulation.

In another embodiment, to achieve the "in the round" effect, the internal cameras may rotate on a track (not shown) so that the stage does not move, but the camera does.

The implementation of the entertainment sphere allows the piggybacking, or interconnection, of many studios to one viewing point, which can duplicated where ever the signal may be carried and displayed. This allows the display to be changed as easily as changing the picture on a conventional television set.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A geodesic sphere-shaped entertainment device comprising, in combination:
    a generally rounded configuration with an inner surface and an outer surface and a wall thickness there between,
    an entertainment device base, the base having a generally tubular configuration with base walls having an inner surface and an outer surface and a floor, the base coupling with the entertainment sphere and forming the base thereof;
    the rounded configuration wall thickness being configured in a lattice wall configuration, with the wall generally being framing, with the framing having a plurality of openings there through;

the entertainment device base walls having a generally rounded outer surface and a generally planar inner surface, the base having an interior space located within the inner surface, with an opening there into;

the floor having a top surface and a bottom surface with a thickness there between, the floor having a plurality of passageways there through from the floor top surface to the floor bottom surface; and a plurality of screen subassemblies coupled to the wall thickness of the entertainment device sphere with each screen subassembly having an innermost extent and an outermost extent, with each of the screen subassemblies having an associated screen frame and a flat plate tempered glass pane protective sheet.

2. The geodesic sphere-shaped entertainment device as described in claim 1 with the device further comprising:

the wall forming a generally regularly shaped lattice configuration, the inner surface of the wall forming the extent of an interior space, the interior space being located within the geodesic sphere-shaped entertainment device;

the passageways of the floor each containing at least one conduit;

each of the subassembly screen frames having a generally trapezoidal shaped configuration having a narrow end and a wide end, the wide end and narrow end each having a length, with the wide end length being longer than the narrow end length; and each flat plate tempered glass pane protective sheet being located at the outermost extent of the subassembly, the tempered glass having a generally trapezoidal shaped configuration having a narrow end and a wide end, the wide end and narrow end being parallel with each having a length, with the wide end length being longer than the narrow end length, the tempered glass pane having an upper end and a lower end with each connecting the wide end length and the narrow end length of the flat plate glass pane.

3. The geodesic sphere-shaped entertainment device as described in claim 2 with the device further comprising:

a first floor conduit being configured to carry a water line and a second floor conduit being configured to carry an electric line and a third floor conduit being configured to carry a coaxial line;

each subassembly frame having a generally C-shaped configuration with an outer side wall having a free edge and an inner, side wall having a free edge and a connecting base wall, with the connecting base wall coupling the inner side wall and the outer side wall in a generally parallel orientation, the frame having an aperture there through, the base wall and side walls forming an inset of each screen frame which is oriented toward the innermost extent, each subassembly having an associated flat panel display coupled thereto;

a pair of associated attachment bars, the attachment bars having a screen frame attachment end and an entertainment device attachment end for coupling the subassembly to the entertainment device wall; and the interior space having a control panel, the control panel comprising electrical controls, water controls, and communications controls.

4. The geodesic sphere-shaped entertainment device as described in claim 3 with the device further comprising:

each of the subassembly frame inner side walls having a length that is greater than the length of the outer side wall, the base wall of the subassembly frame being oriented perpendicular to the side walls of the subassembly frame;

each subassembly having an external gasket being located between the flat plate tempered glass and the flat panel display, the external gasket coupling the flat plate tempered glass and the flat panel display;

each subassembly having an internal gasket located on the edge of the outer side wall of the subassembly frame, the flat plate display panel coupled to the outer surface of the base wall of the subassembly frame, the internal gasket being located between the screen frame and the lattice wall of the entertainment device, the screen frame attachment end clamp being configured to clamp the flat plate glass and the flat panel display to the frame;

the entertainment device attachment end of the attachment bars having a coupling means coupled there to, the screen frame attachment end of the attachment bars having a coupling means coupled there to for coupling the subassembly to the wall of the entertainment device; and the computer being coupled to the flat panel display by a signal coupling means.

5. The geodesic sphere-shaped entertainment device as described in claim 4 with the device further comprising:

each of the flat panel displays having an electrical coupling cable and a power, cable, the coupling and power cables passing through the frame aperture; and the communications controls comprising the computer having program with a memory with the program being configured to control the output from the computer and to control the display which appears on each of the panel displays.

6. The geodesic sphere-shaped entertainment device as described in claim 5 with the computer signal coupling means being radio frequency.

7. The geodesic sphere-shaped entertainment device as described in claim 5 with the computer signal coupling means being coaxial cable.

8. The geodesic sphere-shaped entertainment device as described in claim 5 with the computer signal coupling means being infra red light.

9. The geodesic sphere-shaped entertainment device as described in claim 5 with the entertainment device interior space having a maintenance lift therein.

10. A geodesic sphere-shaped entertainment device comprising, in combination:

a generally rounded framed sphere having a plurality of regularly shaped apertures there through;

a base, coupling the rounded framed sphere a surface with the base having an interior compartment with a doorway there into the compartment;

a plurality of subassemblies, each of the subassemblies being coupled to the rounded framed sphere apertures, each of the subassemblies comprising a panel display with each of the subassemblies having a outermost protective flat glass pane and a display panel and a frame, the display panel being located between the flat glass panel and the frame with the display panel being coupled to the frame and the flat glass panel; and a computer having a memory and a program being operatively coupled to the panel display.

11. The geodesic sphere-shaped entertainment device as described in claim 10 with the device further comprising: the base having a floor, the floor having a plurality of conduits there through, with a first conduit carrying an electrical power line, and a second conduit carrying a water line, and a third conduit carrying a coaxial line.

12. The geodesic sphere-shaped entertainment device as described in claim 10 with the device further comprising a performing stage being located within the Sphere, with the sphere having a power source coupled to a control panel, and a plurality of cameras coupled to the control panel.

13. The geodesic sphere-shaped entertainment device as described in claim 12 with the device further comprising a maintenance lift located within the Sphere, and coupled to the device base.

14. The geodesic sphere-shaped entertainment device as described in claim 10 with the device further comprising a maintenance lift located within the Sphere, and coupled to the device base.

* * * * *